United States Patent [19]

Kawai

[11] Patent Number: 4,857,086
[45] Date of Patent: Aug. 15, 1989

[54] GAS SEPARATOR SYSTEM

[75] Inventor: Masaki Kawai, Fujisawa, Japan

[73] Assignee: Tokico Ltd, Kawasaki, Japan

[21] Appl. No.: 255,986

[22] Filed: Oct. 11, 1988

[30] Foreign Application Priority Data

Oct. 17, 1987 [JP] Japan .................. 62-262398

[51] Int. Cl.⁴ .............................................. B01D 53/04
[52] U.S. Cl. ...................... 55/162; 55/179; 55/270; 55/271; 55/389
[58] Field of Search ............. 55/18, 20, 21, 25, 26, 55/68, 75, 161–163, 179, 270, 271, 389

[56] References Cited

U.S. PATENT DOCUMENTS

| | | | |
|---|---|---|---|
| 4,021,211 | 5/1977 | Turek et al. | 55/18 |
| 4,256,469 | 3/1981 | Lietgeb | 55/25 |
| 4,264,339 | 4/1981 | Jüntgen et al. | 55/25 |
| 4,299,595 | 11/1981 | Benkmann et al. | 55/25 X |
| 4,323,370 | 4/1982 | Leitgeb | 55/18 |
| 4,348,213 | 9/1982 | Armond | 55/25 |
| 4,376,640 | 3/1983 | Vo | 55/26 |
| 4,415,340 | 11/1983 | Knoblauch et al. | 55/25 |
| 4,440,548 | 4/1984 | Hill | 55/26 |
| 4,494,966 | 1/1985 | Umeki | 55/26 |
| 4,548,799 | 10/1985 | Knoblauch et al. | 55/25 X |
| 4,572,723 | 2/1986 | Ward | 55/25 |
| 4,576,614 | 3/1986 | Armond et al. | 55/18 |
| 4,693,730 | 9/1987 | Miller et al. | 55/270 X |

FOREIGN PATENT DOCUMENTS 0250235 12/1987 European Pat. Off. ............. 55/18

Primary Examiner—Robert Spitzer
Attorney, Agent, or Firm—Marmorek, Guttman & Rubenstein

[57] ABSTRACT

A pressure swing adsorption type gas separator system comprises an adsorption column filled with an activated carbon adsorbent and supplied with a compressed air for producing a nitrogen product gas by removing oxygen from the supplied air as a result of adsorption of oxygen on the activated carbon, a first valve for controlling the supply of compressed air to the adsorption column, a second valve for controlling release of oxygen adsorbed on the activated carbon from the adsorption column to the exterior of the gas separator system, and a third valve for controlling delivery of the product gas in the adsorption column to a tank. In operation, the supply of compressed air to the adsorption column, the removal of oxygen from the supplied air by the adsorption, delivery of the nitrogen gas thus obtained to the tank, and release of adsorbed oxygen to the exterior of the gas separator system are performed repeatedly with a predetermined cycle time. The gas separator further comprises an oxygen meter for measuring the concentration of oxygen in the nitrogen gas in the tank and a controller for controlling the cycle time responsive to the level of oxygen concentration in the nitrogen gas in the tank.

10 Claims, 9 Drawing Sheets

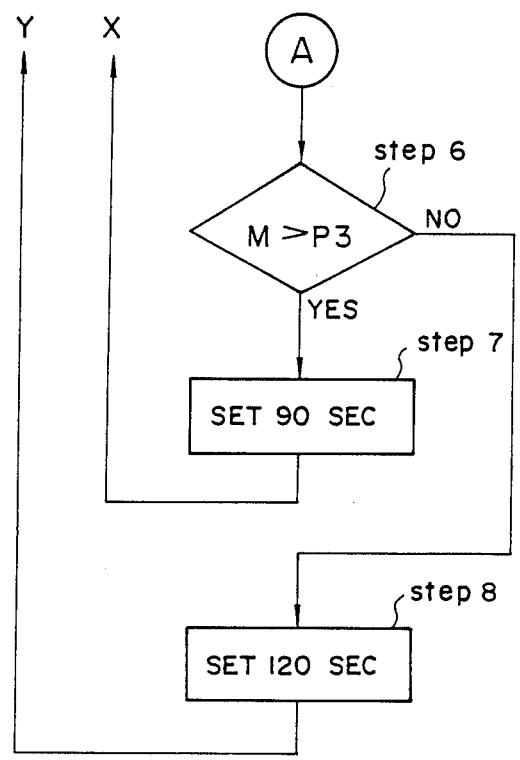

GAS SEPARATOR SYSTEM

BACKGROUND OF THE INVENTION

The present invention generally relates to gas separators and in particular to a pressure swing adsorption type gas separator system for separating the air into nitrogen and oxygen.

A pressure swing adsorption type gas separator system is used for separation of the air into nitrogen and oxygen by using an adsorbent such as a molecular sieving carbon. The molecular sieving carbon is a porous carbon having extremely fine pores (less than 4 A in diameter) and preferentially adsorbs oxygen in the air on the surface of the pore when the air is supplied with a substantially high pressure. Further, such a molecular sieving carbon releases the oxygen adsorbed on it when the pressure is returned to a normal atmospheric pressure or the carbon is subjected to a reduced pressure. The pressure swing adsorption type gas separator system has an advantage in that the structure is relatively simple and it produces a nitrogen gas having a purity suitable for use in preservation of food and the like at a significantly reduced cost.

A typical pressure swing adsorption type gas separator system used for production of nitrogen gas generally uses an adsorption column filled with the molecular sieving carbon and produces the nitrogen gas by repeatedly performing an adsorption step in which compressed air is supplied to the adsorption column and oxygen in the compressed air is removed as a result of the adsorption of oxygen by the molecular sieving carbon, and a releasing step in which the adsorption column is depressurized by releasing the pressure in the adsorption column or by depressurizing the adsorption column by a pump and the like so that the oxygen adsorbed on the molecular sieving carbon is released. The adsorption step and the releasing step are repeated with an optimal repetition period called a cycle time. As a result, the oxygen molecule is removed from the air due to the adsorption by the molecular sieving carbon each time the pressure swing adsorption type gas separator system performs the adsorption step and the desired nitrogen gas is obtained as a residual gas which is a gas remaining in the adsorption column after the removal of oxygen.

As the nitrogen gas is obtained only when the pressure in the adsorption column is increased, the nitrogen gas is obtained only intermittently from the adsorption column. Therefore, the actual pressure swing adsorption type gas separator system uses a tank for storage of the nitrogen gas thus obtained so that the nitrogen gas having a constant pressure is obtained continuously at the site where the nitrogen gas is used.

At an initial state when the pressure swing adsorption type gas separating system begins to operate, the tank usually contains the ordinary air. After the start of operation, the nitrogen in the air is separated or extracted and supplied to the tank through a valve connecting the adsorption column and the tank. As a result, the concentration of nitrogen in the tank gradually increases and finally reaches a purity sufficient for use.

The time interval in which the pressure in the adsorption column is held at a high level in correspondence with the adsorption step, is generally determined by factors such as a flow rate of air flowing into the adsorption column, capacity and specification of air compressor to be used and the like. In a conventional pressure swing adsorption type gas separating system, the period of repetition for one cycle of operation (comprising the adsorption step and the releasing step) of the gas separating system is fixed at an optimum value such as 120 seconds by taking these factors into consideration so that the nitrogen gas having the desired purity is obtained. Such a period of repetition will be referred to hereinafter as a cycle time. However, the conventional pressure swing adsorption type gas separating system has a problem in that it requires a relatively long preliminary running time which is a running time required for the gas separating system to be operated from an initial state at which the operation of the gas separator system is started and the tanks is filled with the ordinary air until a time when the gas in the tank reaches a satisfactory level of purity.

The applicant made a series of experiments in order to eliminate or minimize this problem by variously changing the cycle time. As a result, the following was found:

(1) The running time of the system required for the purity of the nitrogen gas in the tank to reach a level which allows a relatively high concentration of oxygen such as one percent becomes shorter when the cycle time is reduced. However, it is difficult or impossible to obtain a high purity nitrogen gas which contains substantially less oxygen as long as the reduced cycle time is used.

(2) After the purity of the nitrogen gas has reached the aforementioned level, the adsorption steadily proceeds further when the cycle time is increased. By doing so, a nitrogen gas having a purity substantially exceeding 99.5% is obtained.

SUMMARY OF THE INVENTION

Accordingly, it is a general object of the present invention to provide a novel and useful pressure swing adsorption type gas separator system in which the aforementioned problems are eliminated.

Another and more specific object of the present invention is to provide a pressure swing adsorption type gas separator system for producing a product gas by removing undesirable species from a source gas in which a desired purity of product gas is obtained in a reduced running time of the gas separator system by setting a cycle time of the gas separator system to a relatively short time before the purity of the product gas reaches a predetermined level and then setting the cycle time to a relatively longer time after the predetermined level of purity is reached.

Another object of the present invention is to provide a pressure swing adsorption type gas separator system for producing a product gas by removing undesirable gas species from a source gas comprising an adsorption column filled with an adsorbent which adsorbs undesirable gas species under an increased pressure and releases the adsorbed species under a reduced pressure, a supply valve for supplying said source gas in the adsorption column, a relief valve for releasing the gas contained in the adsorption column so that the pressure in the adsorption column is reduced, a take out valve opened for recovering the product gas from which the undesirable species is removed when the pressure in the adsorption column is held high, and a tank for storage of the product gas obtained through the product valve. The gas separator system is operated repeatedly such that the source gas is repeatedly introduced into the adsorption column so that the product gas is repeatedly obtained and filled in the tank, wherein the period of repetition of the aforementioned repetitive operation of the system is made variable stepwise responsive to the purity of the product gas stored in the tank. According to the present invention, the running time of the gas separator system needed for achieving a required purity of the product gas in the tank after the start of the gas separator system is minimized. Further, the pressure swing adsorption type gas separator system of the present invention can quickly expel the air remaining in the tank, piping and valves by using a short cycle time at the time of starting the system. Furthermore, the gas separator system of the present invention can produce a high purity product gas by switching the cycle to a long cycle time once the purity of the product gas reaches a predetermined level.

Still other objects and further features of the present invention will become apparent from the following description when read in conjunction with attached drawings.

DETAILED DESCRIPTION

Next, an embodiment of the gas separator system of the present invention constructed as a nitrogen gas separator will be described with reference to the attached drawings.

Figure 1:
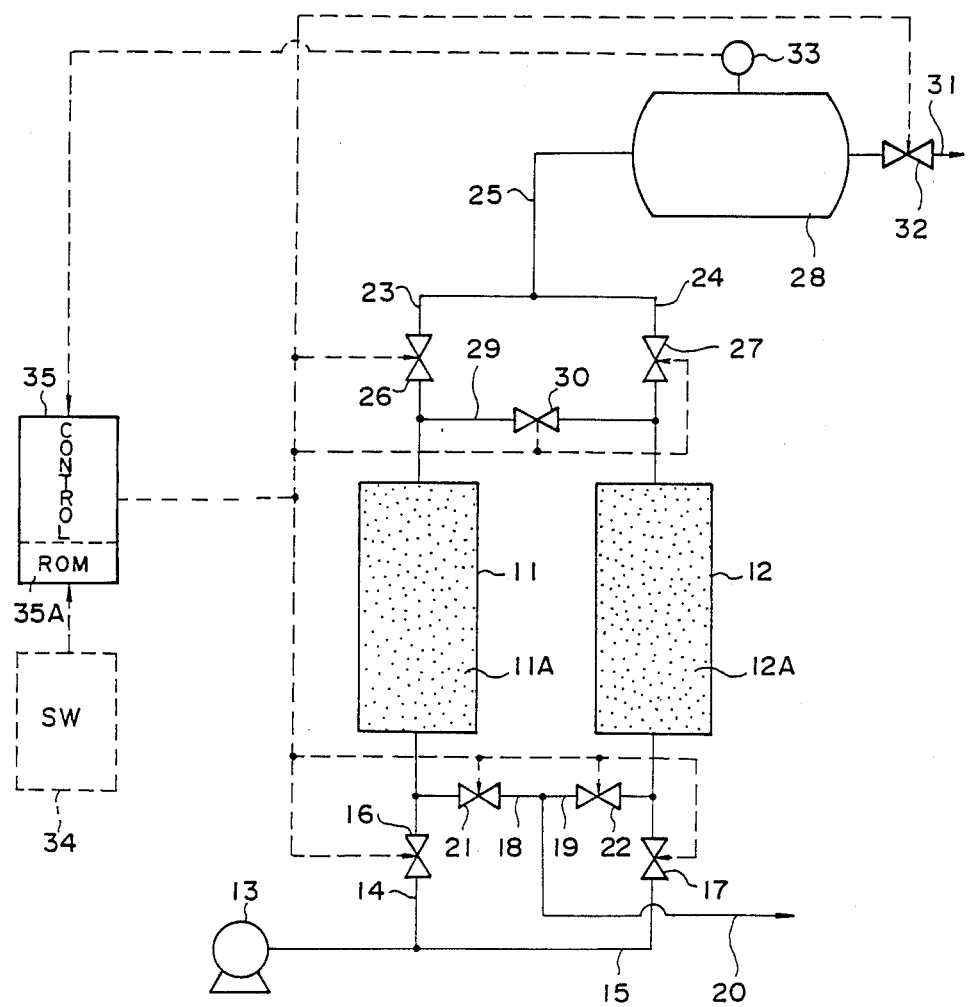
FIG. 1 is a schematic block diagram showing an embodiment of the gas separator system according to the present invention which uses two adsorption columns alternately.

Referring to FIG. 1 which shows an overall construction of the gas separator system of the present invention, the gas separator system comprises a first adsorption column 11 and a second adsorption column 12 respectively filled with a molecular sieving carbon 11A and 12A in a relatively tightly packed state. The molecular sieving carbon 11A and 12A is an activated carbon and may be a product available from Bergbau Forschung GmbH under a trade name CARBON MOLECULAR SIEVES, for example, and generally has a grain size of several millimeters. As already described, the molecular sieving carbon adsorbs oxygen in the air when the air is supplied under pressure. Further, the molecular sieving carbon releases the oxygen which it adsorbed when the pressure of the air is reduced.

The adsorption columns 11 and 12 are supplied with a compressed air from an ordinary air compressor 13 via a pair of conduits 14 and 15 alternately as will be described later. In order to control the supply of the compressed air, electromagnetic valves 16 and 17 are provided on the conduits 14 and 15, respectively. The electromagnetic valves 16 and 17 are controlled by a controller 35 to be described later so as to open and close alternately. Further, another pair of conduits 18 and 19 are connected to the adsorption columns 11 and 12 so as to allow release of the air in the columns at the time the adsorption of oxygen from the air is completed. The downstream side of the conduits 18 and 19 are connected to a common conduit 20 and the air in the columns 11 and 12 is released to the exterior of the system through the common conduit 20. Further, the conduits 18 and 19 are provided with electromagnetic valves 21 and 22 so as to control the release of the air in the adsorption columns 11 and 12. Further, the valves 21 and 22 are also controlled by the controller 35. Furthermore, still another pair of conduits 23 and 24 are connected to the adsorption columns 11 and 12 in order to send a nitrogen gas formed in the adsorption columns 11 and 12 as a result of adsorption of oxygen by the molecular sieving carbon to a tank 28. At the downstream side, the conduits 23 and 24 are connected to a common conduit 25 which eventually is connected to the tank 28. In order to control the supply of the nitrogen gas from the adsorption columns 11 and 12 to the tank 28, electromagnetic valves 26 and 27 are provided on the conduits 23 and 24. As will be described, the valves 26 and 27 are opened alternately during the operation of the gas separator system under control of the controller 35. Further, the adsorption columns 11 and 12 are connected to each other by still another conduit 29 which has an electromagnetic valve 30. This electromagnetic valve 30 is opened each time the adsorption in the adsorption columns 11 and 12 is completed under control of the controller 35 and the pressure in the adsorption columns 11 and 12 are made equal responsive to the opening of the valve 30. This procedure is called equalization.

The tank 28 is supplied with the nitrogen gas alternately from the column 11 or column 12 responsive to the completion of oxygen adsorption in each adsorption column. Further, the tank 28 has a conduit 31 connected thereto for supplying the nitrogen gas contained in the tank 28 to the site where the nitrogen gas is used. In order to control the flow of nitrogen gas from the tank 28, a further electromagnetic valve 32 is provided on the conduit 31. This valve 32 may be controlled by the controller 35 similarly to the other valves or may be controlled manually by the user.

Furthermore, the tank 28 is provided with an oxygen meter 33 which measures the concentration of oxygen in the nitrogen gas in the tank 28. The oxygen meter 33 produces an electrical output signal indicating the oxygen concentration and this electrical output signal is supplied to the controller 35. The oxygen meter may be any such apparatus which produces an electrical signal corresponding to the concentration of oxygen. For example, the oxygen meter may be a magnetic type oxygen meter which uses the paramagnetism of oxygen molecule, an electrolytic oxygen meter which detects an electromotive force produced between a pair of electrodes inserted in an electrolytic solution as a result of oxidation and reduction reaction, or may be a solid state oxygen meter utilizing a zirconia ceramic as the electrolyte and detecting an electromotive force produced between a pair of electrodes formed on the zirconia ceramic.

FIG. 1 further shows a preset switch 34 for presetting a predetermined concentration of oxygen. This predetermined concentration is used in the controller 35 to change a cycle time of the gas separator system to be described later when the concentration of oxygen in the tank 28 reaches the preset level. In a certain embodiment of the gas separator system of the present invention, this preset switch is not used.

Figure 6:
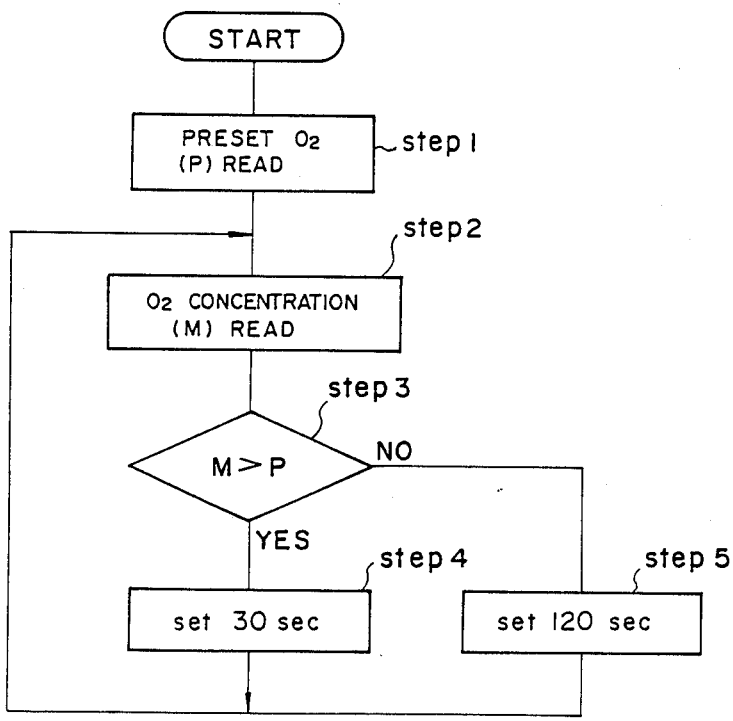
FIG. 6 is a flowchart showing an example of operation of the controller of FIG. 5.

The controller 35 is a microcomputer and is supplied with an input signal from the oxygen meter 33 as well as from the preset switch 34 and controls the opening and closure of the electromagnetic valves 16, 17, 21, 22, 26, 27, 30, and 32. In the gas separator system of the present invention, the controller 35 has a memory 35A such as a read only type memory (ROM), and the ROM 35A stores a program as illustrated in FIG. 6 or in FIGS. 7(A) and (B). In the program in FIG. 6, the gas separator system repeats its operation to be described hereinafter with a period of repetition or cycle time of 30 seconds until the oxygen concentration in the tank 28 reaches 1% and then switches its cycle time to 120 seconds after the oxygen concentration in the tank 28 becomes less than 1%.

Next, a typical operation of a conventional pressure swing adsorption type gas separator system will be described with reference to FIGS. 2 and 3. Such a pressure swing adsorption type gas separator system comprises the system as shown in FIG. 1 with an exception that the controller 35 is a sequential controller controlling the opening and closure of the valves 16, 17, 21, 22, 26, 27 and 30 with a fixed cycle time. As will be obvious, such a conventional pressure swing adsorption type gas separator does not use the oxygen meter 33 and the preset switch 34.

Figure 2:
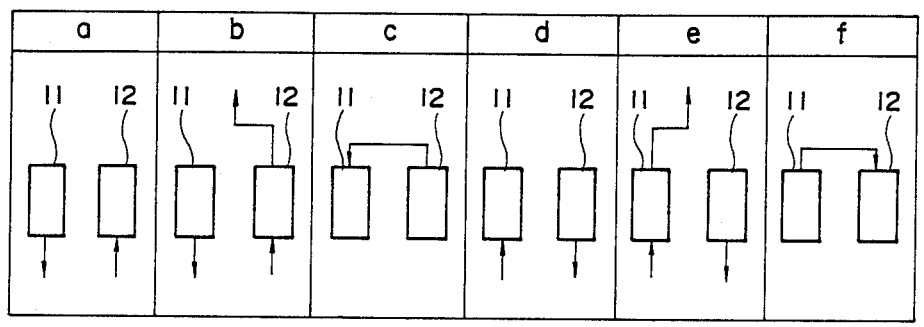
FIG. 2 is a highly schematic drawing showing an operation cycle of the gas separator system of FIG. 1.
Figure 3:
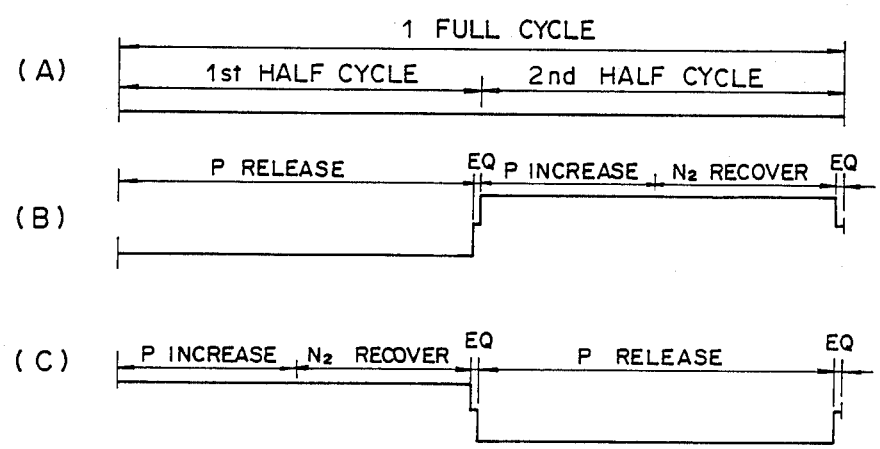
FIG. 3 is a time chart showing the operational steps made in the operation cycle of FIG. 2.

Referring to FIG. 2, the arrows in the drawing pointing to the adsorption columns 11 and 12 represent the inflow of the compressed air from the air compressor 13 to the respective columns and the arrows pointing away from the adsorption columns 11 and 12 represent the outflow of the gas from the adsorption columns 11 and 12.

In a first step (a) in FIG. 2, the valves 17 and 21 are opened and the compressed air is supplied to the second adsorption column 12 so that the adsorption of oxygen by the molecular sieving carbon 12A occurs in the column 12. In this step, therefore, oxygen is removed from the air in the column 12 and a nitrogen gas which remains after the oxygen is removed from the air is formed in the adsorption column 12. This nitrogen gas may contain a small proportion of argon, carbon dioxide, and the like as the air usually contains a small amount of species other than nitrogen and oxygen. However, the existence of these species in the nitrogen gas is allowed in most cases. At the same time, the first adsorption column 11 is opened to the air through the valve 21 so that the oxygen adsorbed on the carbon 11A in a previous cycle is released into the air.

In a next step (b), the valve 27 is opened in addition to the valves 17 and 21, and the nitrogen gas in the adsorption column 12 is transported to the tank 28 through the valve 27. The nitrogen gas in the column 12 is moved by the pressure of the air from the compressor 13 which generates a pressure as high as 8.5 kg/cm$^2$ to the tank 28 which on the other hand contains the nitrogen gas with a pressure of up to 5 kg/cm$^2$. In this procedure, a boundary (not shown) is formed in the column between the nitrogen gas and the air and the mixing of the air and the nitrogen gas does not occur. In this step (b), the valve 21 which communicates the adsorption column 11 to the outside of the system is still opened.

In a next step (c), the valves 17, 21, 26 and 27 are closed and the valve 30 is opened. As a result, the air in the column 12 enriched in nitrogen is supplied to the adsorption column 11 so that the pressure in the adsorption columns 11 and 12 become equivalent. The time interval in which the step (c) is performed is short as compared to the time interval for the step (a) or (b) and may be 1-3 seconds in a typical case.

Responsive to the completion of the step (c), the early half of the operation of the pressure swing adsorption type gas separator system is completed. Following the step (c), the steps (d)-(f), which constitute the latter half of the operation of the pressure swing adsorption type gas separator system, are started sequentially by opening the valves 16 and 22 so that the compressed air from the air compressor is supplied to the adsorption column 11 and so that the pressure in the adsorption column 12 is released through the valve 22. It should be noted that the oxygen adsorbed on the carbon 12A is released responsive to the decrease in the pressure in the column 12. The steps (d)-(f) are the same as the steps (a)-(c) except that the adsorption column used for removal of oxygen from the air is the column 11 instead of the column 12 and that the valves that are opened and closed are changed responsive to the change in the adsorption column. Thus, in the step (d), the valves 16 and 22 are opened and the rest of the valves are closed similarly to the step (a). As a result, the fresh air is supplied to the adsorption column 11 and the nitrogen is obtained in the column 11 as a result of adsorption of oxygen. In the step (e), the valve 23 is further opened and the nitrogen gas in the column 11 is delivered to the tank 28 similarly to the case of the step (b). Further, in the step (f), all the valves are closed except for the valve 30 and the pressure levels in the column 11 and the column 12 are equalized.

In operation of the typical pressure swing adsorption type gas separator system, the steps (a)-(f) are repeated with a predetermined period of repetition or cycle time. This cycle time may be 120 seconds, for example, in which the early half of the operation (steps (a)-(c)) is continued for 60 seconds and the latter half of the operation (steps (d)-(f)) is continued for another 60 seconds. In the conventional pressure swing adsorption type gas separator system, the cycle time of the operation of the system is fixed.

FIG. 3(A) is a time chart showing the operation for one cycle of the typical gas separator system as shown in FIG. 2. As aforementioned, the one cycle of the operation comprises the early half cycle corresponding to the steps (a)-(c) and the latter half cycle corresponding to the steps (d)-(f). FIG. 3(B) shows the operation of the adsorption column 11 in a same time scale as that of FIG. 3(A). From FIG. 3(B), it can be seen that the column 11 is in a depressurized state in the steps (a) and (b) and that the column 11 is in an intermediately pressurized state in which the pressure in the column is equivalent to the pressure in the adsorption column 12 in the step (b). When the operation of the gas separator system proceeds to the latter half of the operation cycle, fresh air is supplied to the column 11 from the air compressor 13 and the pressure in the column 11 is increased in the step (d). In this step (d), nitrogen is extracted from the air as a result of adsorption of oxygen by the molecular sieving carbon 11A, and the nitrogen thus obtained is delivered to the tank 28 by the pressure of the air from the compressor 13 in the step (e). Further, in the step (f), the pressure in the column 11 is equalized to the pressure in the column 12.

FIG. 3(C) is a time chart similar to FIG. 3(B) in which the operation of the adsorption column 12 is shown. In the adsorption column 12, the pressure is raised in the early half of the operation cycle of the gas separator system in an exactly the same manner as in the adsorption column 11 in the latter half cycle. Thus, in the step (a), the fresh air is supplied to the column 11 and the nitrogen gas is formed as a result of adsorption of the oxygen by the carbon 11A. In the step (b), the nitrogen gas in the column 11 is delivered to the tank 28. Further, the pressure in the column 11 is equalized to the pressure in the column 12 in the step (c). In the latter half period of the operation, the pressure in the column 11 is reduced in correspondence with the steps (d) and (e), and then equalized in the step (f) as aforementioned.

Next, a finding resulting from experiments made by the applicant which constitutes the basis of the present invention will be described with reference to FIG. 4.

The applicant made a series of experiments in which nitrogen was extracted from the air by using the pressure swing adsorption type gas separator system as shown in FIG. 1 while variously changing the cycle time. The experiments commenced from an initial state in which the adsorption columns 11 and 12, and the tank 28 were filled with the air and the change in the concentration of oxygen in the tank 28 was measured as a function of time by means of the oxygen meter 33 while using various cycle times. Referring to FIG. 4, when the cycle time is set to 30 seconds (indicated by open circles in the drawing) and the gas separator system begins to operate, the concentration of oxygen in the tank 28 decreases rapidly at first. Using this cycle time, however, is was found that the concentration of oxygen cannot be substantially educed below about 0.7% when the running time of the gas separating system exceeds about 30 minutes.

On the other hand, when the cycle time is set to 60 seconds (shown by a triangle in the drawing), the concentration of oxygen in the tank 28 does not decrease so rapidly as compared to the case when the cycle time is set to 30 seconds. However, the oxygen concentration steadily decreases with time even if the running time exceeds thirty minutes. Thus, when the running time exceeds about 36 minutes (shown in the drawing by a point P1), the oxygen concentration in the tank 28 becomes lower as compared to the case in which the cycle time is set to 30 seconds. In other words, the purity of the nitrogen gas finally obtained is higher when the cycle time is set to 60 seconds in comparison to the case in which the cycle time is set to 30 seconds.

Figure 4:
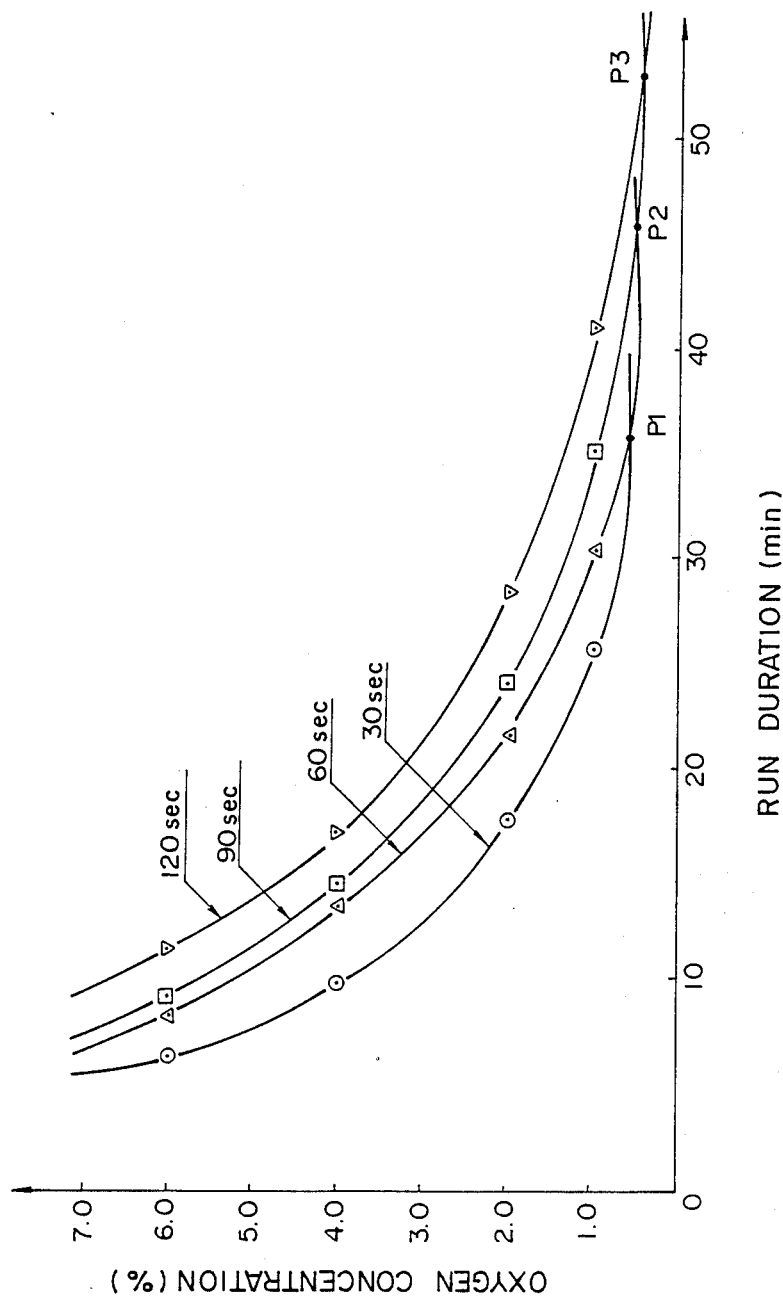
FIG. 4 is a graph showing a result of experiment which constitutes a basis of the present embodiment.

Further, when the cycle time is set to 90 seconds, the rate of decrease in the oxygen concentration in the nitrogen gas in the tank 28 becomes slower still but the purity of the nitrogen gas can be further improved by a prolonged running time exceeding substantially about 46 seconds (P2 in FIG. 4). Furthermore, by setting the cycle time to 120 seconds, the aforementioned tendency appears more clearly and a highly pure nitrogen gas having the highest purity is obtained by extending the running time substantially longer than about 52 minutes (P3 in FIG. 4).

Generally, the required purity of nitrogen gas changes depending on what it is used for, and the nitrogen gas having a high purity is not always needed. Thus, one can reduce the running time of the pressure swing adsorption type gas separating system by using the short cycle time.

Further, by extending the cycle time stepwise each time the purity of the oxygen in the tank 28 reaches the level defined by the points P1, P2 and P3 in the drawing, one can obtain a highly pure nitrogen gas with a minimum running time of the gas separator system.

Figure 5:
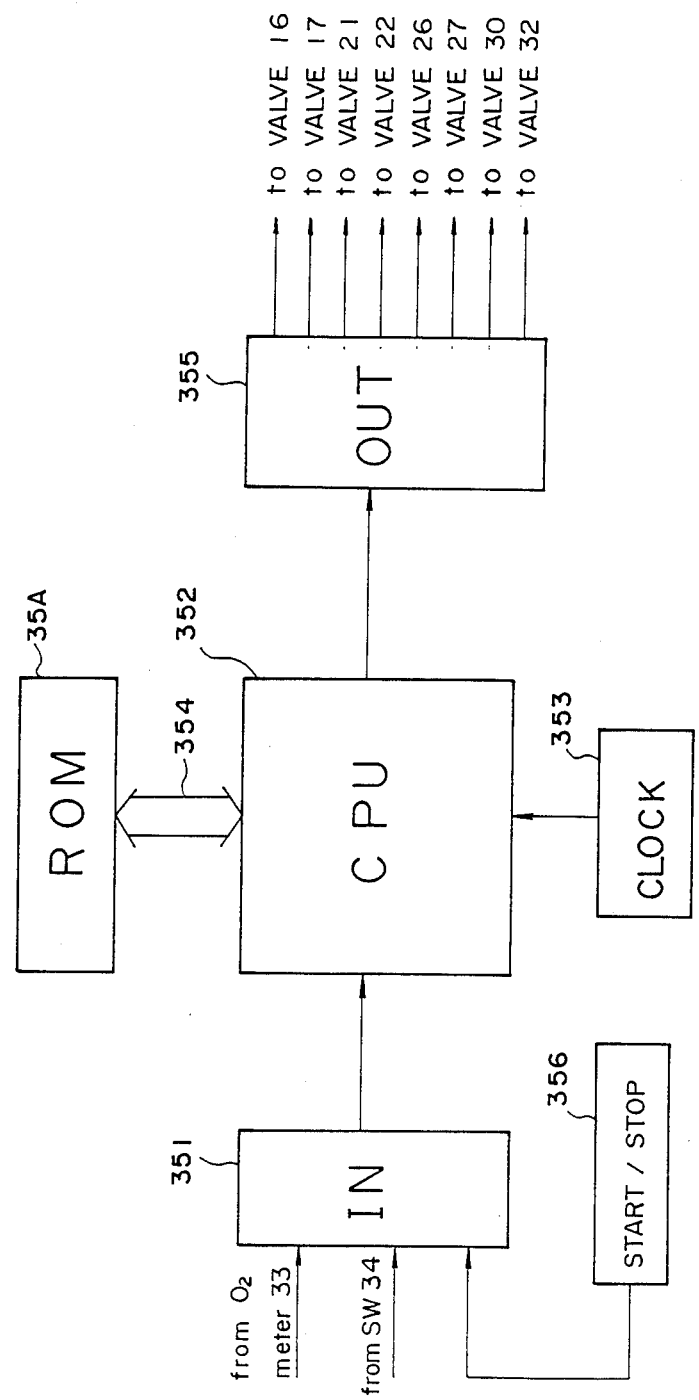
FIG. 5 is a block diagram showing the construction of a sequence controller in FIG. 1.

FIG. 5 is a block diagram of the controller 35 used in the pressure swing adsorption type gas separator system for changing the cycle time responsive to the purity of the nitrogen gas obtained in the tank 28. Referring to the drawing, the controller 35 comprises an input interface 351 to which the oxygen meter 33 and the preset switch 34 are connected, a central processing unit (CPU) 352 connected to the input interface 351, a clock connected to the CPU 352 for supplying a clock signal to the CPU, the memory 35A connected to the CPU by a bus 354, and an output interface 355 connected to the CPU 352 for receiving a control data from the CPU. The input interface 351 may further be connected with a START/STOP switch 356 operated by the user for instructing to the controller 35 to start the operation of the gas separator system or to stop the gas separator system, and supplies a data to the CPU 352 indicating the oxygen concentration in the tank 28 and the preset oxygen level preset by the switch 34. Responsive to the data from the interface 351, the CPU 352 operates according to a program stored in the ROM 35A and produces a control data to be supplied to the output interface 355 on the basis of the clock signal from the clock 353. The output interface converts the control data outputted from the CPU 352 to electrical signals for energizing the solenoid of the respective valves via lines indicated by a broken line in FIG. 1.

Next, an example of the operation of the pressure swing adsorption type gas separator system of the present invention will be described with reference to FIGS. 4 and 6. FIG. 6 is an example of a flowchart of the program stored in the ROM 35A. Referring to the drawings, a predetermined oxygen concentration level P at which the cycle time of the gas separator system is to be changed is set by presetting the switch 34. This level P may be set to 1.0%, for example. Referring to FIG. 6, responsive to the start of the gas separator system, the controller 35 reads the preset value P from the switch 34 in a step 1 and then reads the concentration of oxygen M detected by the oxygen meter 33 in a step 2. In a following step 3, the controller 35 compares the value M and the value P and discriminates if M is larger than P or not. When the step 3 is performed immediately after the start of the operation of the gas separator system, the oxygen concentration in the tank 28 is naturally not significantly different from that in the air and the result of discrimination becomes YES. Responsive to this result, the operation proceeds to a step 4 in which the cycle time is set to 30 seconds. As a result, the sequence controller 35 controls the valves by a control signal such that the opening and closure of the valves 16, 17, 21, 22, 26, 27 and 30 are repeated as described with reference to FIG. 2 with a period of repetition or cycle time of 30 seconds.

After a cyclic repetition of the operation of the gas separator, the oxygen concentration in the nitrogen tank 28 decreases gradually and finally reaches a state in which the value M is equal to or smaller than the value P. In this state, the result of discrimination in the step 3 becomes NO and the operation in a step 5 is performed with the cycle time being set to 120 seconds. As a result, the controller supplies the control signal to the sequence controller 35 so that the operation of the gas separator system is repeated with a cycle time of 120 seconds.

As previously described, FIG. 4 shows the relationship between the running time of the gas separator system and the oxygen concentration in the tank 28. As can be seen clearly in FIG. 4, the running time of the gas separator system from the initial state in which the tank 28 is filled with the air to a state in which the oxygen concentration in the tank 28 reaches the 1% level is about 26 minutes when the cycle time is set to 30 seconds. On the other hand, the corresponding running time is about 41 minutes when the cycle time is fixed to 120 seconds from the beginning.

The controller 35 loaded with the program in FIG. 6 sets the cycle time such that the cycle time is set to 30 seconds when the gas separator system is started from the initial state in which the tank 28, the piping 23, 24 and 25 and valves 26 and 27 contain the air. Once the oxygen concentration in the tank 28 decreased below 1% the controller 35 changes the cycle time from 30 seconds to 120 seconds. Thus, the running time needed for decreasing the oxygen concentration in the tank 28 to the 1% level is reduced from the conventional 41 minutes to 26 minutes and the running time is reduced by as much as 15 minutes. Further, the gas separator system of the present invention switches the cycle time from 30 seconds to 120 seconds once the oxygen concentration in the tank 28 is decreased to 1%. As a result, a highly pure nitrogen gas having a purity as high as 99.5% is obtained by continuous operation of the gas separator system.

Figure 7A:
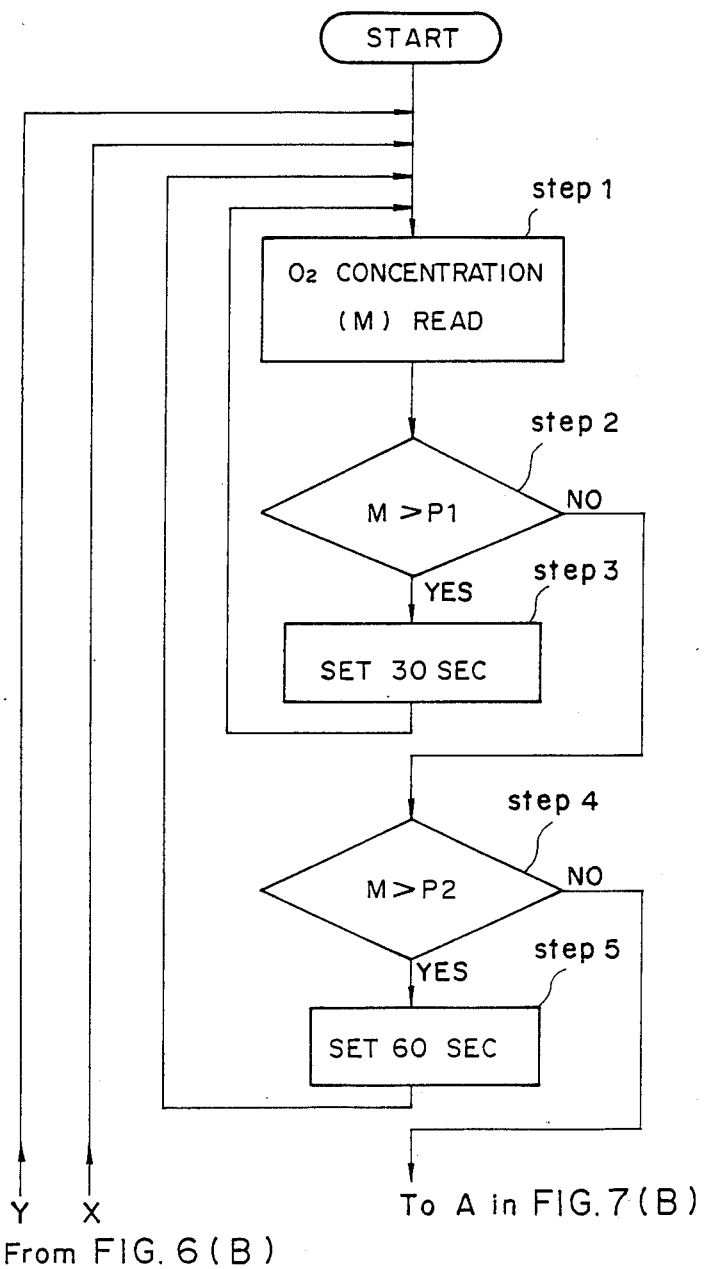
FIGS. 7(A) and (B) are flowcharts showing another example of operation of the controller in the gas separating system of FIG. 1.

FIGS. 7(A) and (B) are flowcharts showing another example of the control program loaded on the ROM 35A in order to achieve a high nitrogen purity with a minimum running time. Referring to the drawings, the points P1, P2 and P3 represent the points respectively defined as an intersection of the curves corresponding to the 30 second cycle time and the 60 second cycle time, an intersection of the curves corresponding to the 60 second cycle time and the 90 second cycle time, and an intersection of the curves corresponding to the 90 second cycle time and the 20 second cycle time as already described. In the following description, the values of oxygen concentration corresponding to the points P1, P2 and P3 are also designated as P1, P2 and P3, respectively. These values are stored in the ROM 35A together with the program.

Referring to FIGS. 7(A) and (B), the oxygen concentration in the tank 28 is measured by the oxygen meter 33 and the result of the measurement is stored as a value M in a step 1 similarly to FIG. 6. Next, the value M is compared with the value P1 stored in the ROM 35A in a step 2. If the value M is larger than the value P1, the cycle time is set to 30 seconds. On the other hand, if the value M is equal to or smaller than the value P1, the value M is compared with the value P2 stored in the ROM 5A in a step 4. If the value M is larger than the value P2, the cycle time is set to 60 seconds in a step 5. On the other hand, if the value M is equal to or smaller than the value P2, the value M is compared with the value P3 stored in the ROM 35A in a step 6. If the value M is larger than the value P3, the cycle time is set to 90 seconds in a step 7. If the value M is equal to or smaller than the value P3, the cycle time is set to 120 seconds in a step 8.

Thus, the cycle time of the gas separator system is controlled along a path passing through the points P1, P2 and P3 in FIG. 4 and the purity of the nitrogen gas in the tank 28 is maximized in a minimum time period. Further, the use of control sequence shown in FIGS. 7(A) and (B) eliminates the necessity of using the preset switch 34 as shown in FIG. 1.

According to the gas separator system controlled by the program shown in FIGS. 7(A) and (B), the running time required to operate the gas separator system from the initial state to a state in which the nitrogen gas having a sufficient purity is obtained is significantly reduced similarly to the case in which the program shown in FIG. 6 is used.

Figure 8A:
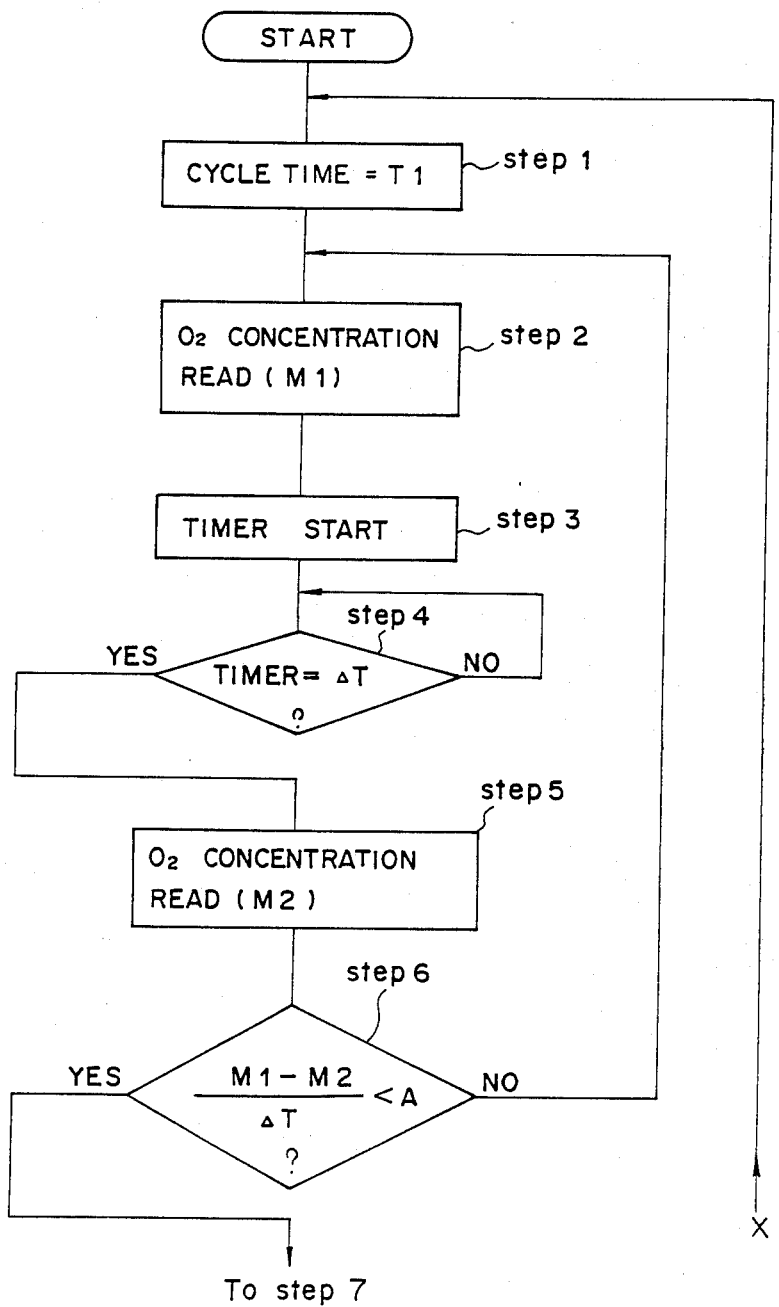
FIGS. 8(A) and (B) are flowcharts showing still another example of operation of the controller in the gas separating system of FIG. 1.
Figure 8B:
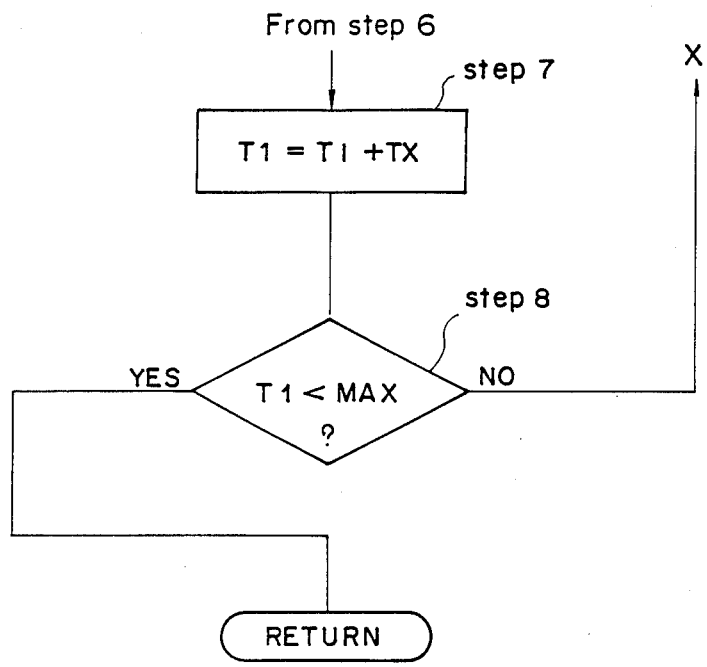

FIGS. 8(A) and (B) show still another example of the operation of the controller 35. Referring to the drawings, the cycle time is set to an initial value T1 in a step 1. This initial value T1 may be chosen to be 30 seconds, for example. Next, the concentration (M1) of oxygen in the product gas in the tank 28 is measured in a step 2 by using the oxygen meter 33. At the same time, a timer is started in a step 3 and the controller 35 waits in a step 4 until a time $\Delta T$ is passed. When the time $\Delta T$ has passed, the concentration (M2) of oxygen in the product gas in the tank 28 is measured again in a step 5. Further, the rate of change in the concentration of oxygen in the product gas in the tank 28 is calculated in a step 6. In the step 6, it is further discriminated whether the rate of change is smaller than a predetermined value A, and if the result is NO, the steps from the step 2 are repeated. On the other hand, if the result is YES, this means that the concentration of oxygen in the tank 28 is not changing and in a step 7 the cycle time T1 is re-set to T1+TX where TX is a predetermined increment of the cycle time. Further, it is discriminated in a step 8 if the cycle time T1 thus re-set exceeds a predetermined maximum MAX of the cycle time. If the result is NO, this means that the concentration of oxygen in the product gas in the tank 28 is still changing with time and the operations from the step 1 are repeated with another cycle time which is increased as a result of resetting in the step 7. On the other hand, if the result is YES, the cycle time is no longer increased. According to the control program shown in FIGS. 8(A) and (B), the cycle time is changed stepwise when the rate of change in the oxygen concentration with time becomes stationary as a result of decrease in the oxygen concentration in the nitrogen gas in the tank 28 until the maximum MAX is reached.

In the description heretofore, the pressure swing adsorption type gas separator system is used for extraction of nitrogen from the air. However, the gas separator system of the present invention is not limited to such an embodiment but may be used for extraction of oxygen or carbon dioxide as well. Further, the number of the adsorption columns is not limited to two but may be one or may be three or more.

Figure 9:
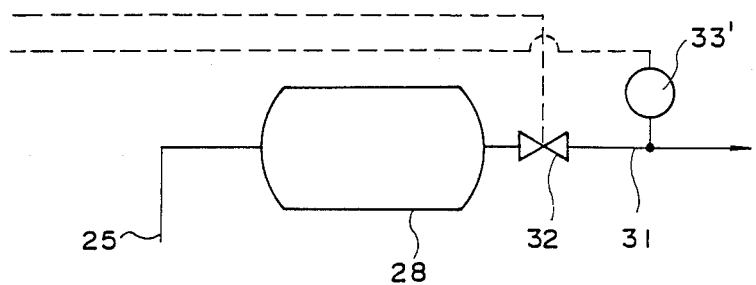
FIG. 9 is a partial view showing a modification of the gas separator system of FIG. 1.

Further, the location of the oxygen meter 33 is not limited to the location on the nitrogen tank 28 as shown in FIG. 1 but may be provided at other locations suitable for measuring the oxygen concentration in the nitrogen gas in the tank 28. FIG. 9 shows an example of such a modification. Referring to the drawing, an oxygen meter 33' having a similar design and performance as the oxygen meter 33 is provided on the conduit 31 at a downstream side of the valve 32. The oxygen meter is connected similarly to the controller 35 and in operation measures the oxygen concentration in the nitrogen gas flowing out from the tank 28 through the valve 32. The rest of the construction and operation of the gas separator system is exactly the same as the system shown in FIG. 1.

Further, it is noted that the cycle time used in the gas separator system is not limited to the values such as 30, 60, 90 and 120 seconds but other values can be used as well.

Further, the present invention is not limited to those embodiments but various variations and modifications may be made without departing from the scope of the invention.

What is claimed is:

1. A gas separator system for producing a product gas by separation of molecular species contained in the air comprising:

adsorption column means supplied with a compressed air and adapted for accommodating an adsorbent which selectively adsorbs a first molecular species from the supplied compressed air for producing a product gas by removal of said first molecular species from the supplied compressed air in a form of a by-product gas;

first valve means connected to the adsorption column means for controlling the supply of the compressed air to the adsorption column means;

second valve means connected to the adsorption column means for controlling the release of said by-product gas from the adsorbent to an exterior of the gas separator system;

a tank for storing the product gas produced in said adsorption column means;

third valve means connected to said adsorption column means and to the tank for controlling the inflow of the product gas from the adsorption column means to the tank;

concentration measuring means provided for measuring the purity of the product gas contained in said tank and for producing an output signal indicating the purity of the product gas in the tank; and a controller electrically connected to said first, second and third valve means for controlling the opening and closure of the valve means such that a cyclic operation is performed repeatedly with a predetermined period of repetition, said cyclic operation comprising a first half cycle operation which in turn comprises a first step in which said first valve means is opened and the second and third valve means are closed so that the compressed air is introduced to the adsorption column means and the adsorption column means is held in a pressurized state and a second step in which the third valve means is opened and the first and second valve means are closed so that the product gas in the adsorption column means is delivered to the tank, and a second half cycle in which said second valve means is opened and said first and third valve means are closed so that the adsorption column means is held in the depressurized state and the by-product gas in the adsorption column means is released to an exterior of the gas separator system, said controller being further supplied with the output signal indicating the purity of the product gas in the tank from the concentration measuring means and changing said predetermined cycle of repetition of said cyclic operation responsive to the purity of the product gas.

2. A gas separator system as claimed in claim 1 in which said controller comprises a microprocessor and memory means stored with at least one purity level of said product gas, said microprocessor comparing the purity of the product gas in the tank measured by the concentration measuring means with the concentration value stored in the memory means and changing the period of repetition of said cyclic operation stepwise responsive to the result of comparison.

3. A gas separator system as claimed in claim 2 in which said species removed from the compressed air supplied to said adsorption column means is oxygen, said measuring means for measuring the purity of the product gas in the tank measures the concentration of oxygen in the product gas in the tank, said memory means being stored with at least one oxygen concentration level, and said microprocessor increasing the period of repetition of said cyclic operation stepwise each time that the concentration of oxygen in the product gas in the tank is decreased below each of said at least one oxygen concentration level stored in the memory means.

4. A gas separator system as claimed in claim 2 in which said change in the cycle time is made when the rate of change in the purity of the product gas measured by said concentration measuring means becomes substantially stationary.

5. A gas separator system as claimed in claim 1 in which a switch is connected to the controller for supplying a command signal of a user commanding start and stop of operation of the gas separator system.

6. A gas separator system as claimed in claim 1 further comprising a preset switch for presetting a predetermined purity of said product gas, said controller comparing the purity of the product gas in the tank measured by the concentration measuring means with said predetermined value preset by the preset switch and changing the predetermined period of repetition of said cyclic operation responsive to the result of the comparison.

7. A gas separator system as claimed in claim 1 in which said adsorption column means comprises first and second adsorption columns, said first valve means comprising first and second conduits respectively connected to the first and second adsorption columns and a first and second valves respectively provided on the first and second conduits, said second valve means comprising third and fourth conduits respectively connected to said first and second adsorption columns and third and fourth valves respectively provided on the third and fourth conduits, said third valve means comprising fifth and sixth conduits respectively connected to said first and second adsorption columns and fifth and sixth valves respectively provided on said fifth and sixth conduits, said adsorption column means further comprising a seventh conduit connecting said first and second adsorption columns and a seventh valve provided on said seventh conduit and having its opening and closing operation controlled by said sequence control means, said sequence control means performing in said first half cycle a first control step in which said first and fourth valves are opened and the rest of the valves are closed, a second control step in which said fourth and fifth valves are opened and the rest of the valves are closed, and a third control step in which said seventh valve is opened and the rest of the valves are closed, said sequence control means further performing in said second half cycle a fourth control step in which said second and third valves are opened and the rest of the valves are closed, a fifth control step in which said third and sixth valves are opened and the rest of the valves are closed, and a sixth control step in which said seventh valve is opened and the rest of the valves are closed.

8. A gas separator system as claimed in claim 7 in which said first, second, fourth and fifth control steps are carried out for a substantially identical time interval.

9. A gas separator system as claimed in claim 1 in which said concentration measuring means is provided on said tank so as to measure the purity of the product gas in the tank.

10. A gas separator system as claimed in claim 1 in which said concentration measuring means for measuring the purity of the product gas in the tank is provided on a conduit connected to said tank for delivering the product gas in the tank to a site where the product gas is used.

* * * * *